Figure 1:
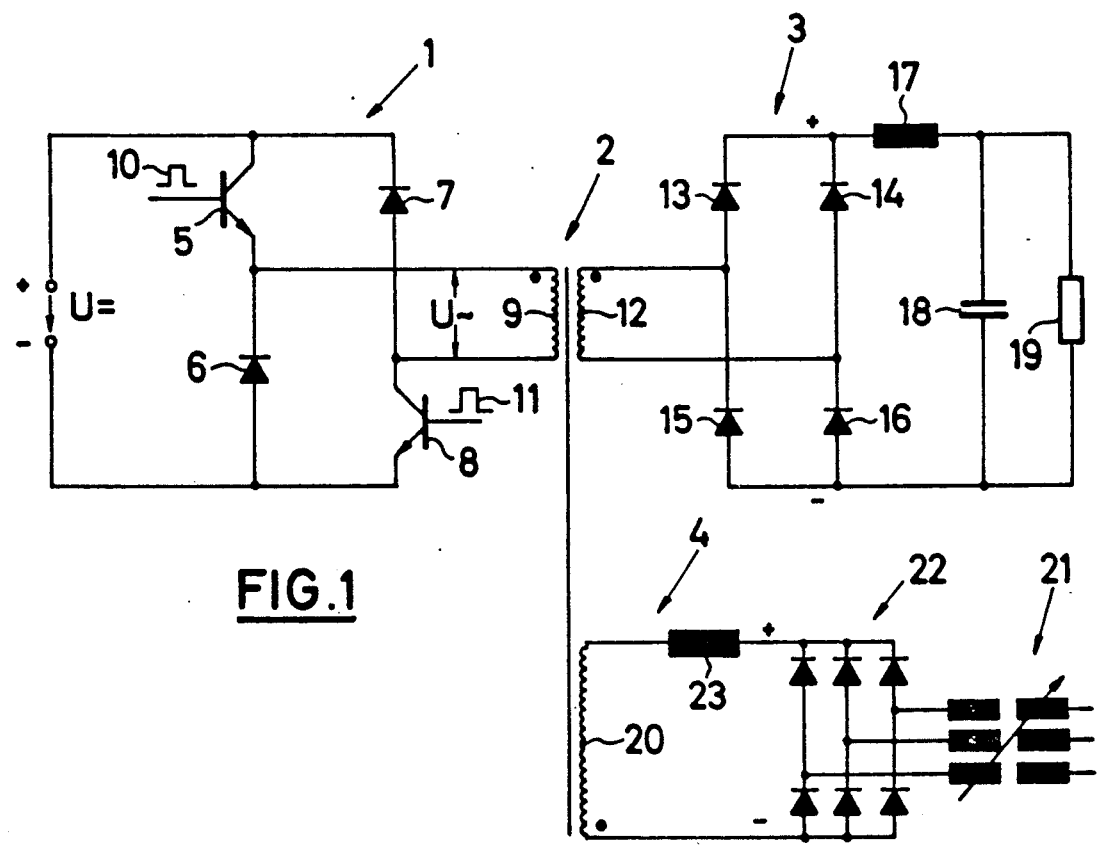

United States Patent [19]

Sperzel et al.

[11] Patent Number: 5,047,911
[45] Date of Patent: Sep. 10, 1991

[54] DEVICE FOR A UNIPOLARLY OPERATED ELECTRICAL CIRCUIT COMPONENT

[75] Inventors: Wolfgang Sperzel, Gelnhausen-Hailer; Horst Landwehr, Hanau; Johann Sturmer, Freigericht; Friedrich-Werner Thomas, Gelnhausen; Guido Hubertus, Hochheim, all of Fed. Rep. of Germany

[73] Assignee: Leybold Aktiengesellschaft, Hanau, Fed. Rep. of Germany

[21] Appl. No.: 223,035

[22] Filed: Jul. 22, 1988

[30] Foreign Application Priority Data

Jul. 25, 1987 [DE] Fed. Rep. of Germany ....... 3724649

[51] Int. Cl.[5] ............................................. H02H 7/122
[52] U.S. Cl. ....................................... 363/56; 363/16; 363/97; 323/356
[58] Field of Search .................. 323/356, 357; 307/1, 307/2; 363/16, 17, 20, 24, 56, 97, 98, 131, 132

[56] References Cited

U.S. PATENT DOCUMENTS

| | | | |
|---|---|---|---|
| 3,848,178 | 11/1974 | Marks | 323/357 |
| 4,054,829 | 10/1977 | Searle | 323/356 |
| 4,064,449 | 12/1977 | Macrander | 323/356 |
| 4,435,747 | 3/1984 | Furuichi et al. | 363/25 |
| 4,672,517 | 6/1987 | Mandelcorn | 363/20 |
| 4,736,285 | 4/1988 | Cohen | 363/20 |
| 4,782,437 | 11/1988 | Nishiyama et al. | 363/97 X |

FOREIGN PATENT DOCUMENTS 3603071 2/1986 Fed. Rep. of Germany .
2127239A 9/1983 United Kingdom .

OTHER PUBLICATIONS

Orengo et al., "DC Flux Compensating Circuit for Reducing the Size of Transformers", IBM Technical Disclosure, 6/78, pp. 223–224.

"Constant Voltage Electric Source Circuit of Direct Current", in: Patent Abstracts of Japan, Sec. E, vol. 3, No. 8, 1979, E–91.

"High Voltage Stabilized Power Source", in: Patents Abstracts of Japan, Sec. E, vol. 8/No. 99, 1984, E–243; pp. 355–358.

"A Regulated DC–DC Voltage Source Converter Using a High Frequency Link" in: IEEE Transactions on Industry Applications, vol. 1A–1B, No. 3, May/Jun. 1982; pp. 279–287.

Primary Examiner—Steven L. Stephan
Assistant Examiner—Kristine Peckman
Attorney, Agent, or Firm—Townsend and Townsend

[57] ABSTRACT

The invention relates to a device (20) for a unipolarly operated component (9) capable of storing energy. This device (20) can be applied, for example, in an asymmetrical half bridge circuit (1). It compensates the dc magnetic flux which originates due to the unipolar operation and, hence permits making relatively small in size the component (9) capable of storing energy. Using a current converter (25, 32) with suitable winding ratio as an automatic and load-dependent compensation device, moreover, permits very flexible adaptation to load changes. Such adaptation is, in particular, required when very high pulsating current occurs on the primary side with simultaneous secondary no-load operation.

16 Claims, 3 Drawing Sheets

DEVICE FOR A UNIPOLARLY OPERATED ELECTRICAL CIRCUIT COMPONENT

The invention relates to a device for a unipolar electrical circuit component which can store magnetic energy, with the magnetic flux generated by this component being varied by a superimposed magnetic flux.

In order to operate electrical dc current consumers from an ac or poly-phase current supply, in general, controllable rectifier circuits with adapter transformers and subsequent filtering means are used. Since the dimensions of these adapter transformers and filtering means for a 50 Hz line ac voltage are relatively large, high-frequency choppers of, for example 20 KHz are used, the output ac voltage of which is rectified; it is, moreover, possible to generate from a fixed dc voltage generated from the source a variable dc voltage by modulating the pulse width. Either asymmetrical half bridge circuits or symmetrical full bridge circuits in conjunction with low-leakage transformers are used as choppers (cf. Thomson CSF, Handbuch II, Transistor in der Leistungselektronik, chapter XIII, Joel Redouty, Grundlagen fur die Entwicklung eines Schaltnetzteils fur den Betrieb am 380 V-Netz, pages 225 to 241). These two converter circuits behave in fundamentally different ways. The reason lies in that the full bridge circuit represents a symmetrical converter, in which the magnetic flux is bipolar. The magnetic operating point here describes a cycle symmetrical to the zero point, and the mean value of the core flux is equal to zero.

The half bridge circuit operates asymmetrically, i.e. the magnetic flux is unipolar because the magnetic operating point, respectively the magnetic flux in this case describes a cycle in only one quadrant and the mean value of the flux is not equal to zero. For that reason the transformer in an asymmetric converter is magnetized in the energy transfer phase, which requires an additional degaussing phase, in which no energy is transferred. In the asymmetric converter, consequently, only during part of the period, for example maximally 50%, energy transfer can take place. In dc-current/dc-current conversion, therefore, not a full-wave rectifier circuit is connected to the output of an asymmetrical converter but only a half-wave rectifier circuit.

Although the symmetrical converter appears to have decisive advantages compared to the asymmetrical converter, in practice the asymmetrical converter is, nevertheless, frequently preferred, because a symmetrical converter never operates entirely symmetrically and for that reason requires costly symmetry correction circuits. Furthermore, relative to the theoretical dimensioning, the transformer must be implemented larger in size in order to avoid unintentional saturation.

A regulated dc voltage/dc voltage converter is already known, which uses a high-frequency link (Ranganathan, Ziogas, and Stefanovich: A Regulated DC-DC Voltage Source Converter Using a High Frequency Link, IEEE Transactions on Industry Applications, Vol. IA)18, No. 3, May/June 1982, pages 279 to 287). This high-frequency link has a half bridge circuit with two thyristors and two diodes, which chops a dc voltage. The chopped voltage is subsequently supplied to a full-wave rectifier bridge across a transformer. The voltage is regulated by changing the frequency with which the thyristors of the half bridge circuit are driven. In addition, a special tank circuit is provided.

Furthermore, a stabilized high-voltage source is known which has an asymmetrical half bridge circuit with a transformer as load, with the secondary side of this transformer connected to a full bridge circuit (Japanese patent application (examined) 59-17869). This stabilized high-voltage source has a regulated voltage source of smaller capacity, which is connected in series with a conventional and non-regulated three-phase full-wave voltage source. The transistors of the stabilized voltage source are driven in conventional manner, i.e. the two transistors are driven simultaneously and with pulses of identical pulse wave shape. Only the width of the pulses is variable in order to achieve a kind of pulse width modulation.

In addition, a D.C. converter with transformer is known, in which constant premagnetization bias of the transformer core is provided (DE-AS 10 64 122). Premagnetization is constant and is generated with a permanent magnet or with battery voltage. Continuous flux compensation cannot be achieved in this manner.

Constant premagnetization is also known in transformers in switched mode power supplies, where two superimposed currents flow through a smoothing choke: a high dc current component and an ac current component, the amplitude of which is most often small (Rene Sibille: Ferritwerkstoffe und Kerne fur Schaltnetzteile, Elektronik 24/Dec. 3, 1982, pp. 101/102). In order to increase the limit value of the current, which may flow through a given choke, or to reduce the latter's dimensions, small permanent magnets are placed into the magnetic circuit instead of an air gap. However, constant flux compensation is also not possible in these switched mode power supplies.

In order to avoid a bias excitation of a transformer and to protect a main switching element, an auxiliary coil is provided, which generates a magnetic field, which compensates the magnetic field of the primary winding (together with the transformer) only if the current through the primary winding of the transformer is an eddy current (JP 53 147223 A. In: Patents Abstracts of Japan, Sect. E, Vol. 3, No. 8, 1979, E-91). However, constant resetting of the core in this known device, in which a throughflow converter is realized, does not take place.

Further, a clocked current supply is known, in which a small bias winding on a transformer is provided, so that both sides of the operating range of the B/H curve of the transformer core can be utilized to achieve increased effectivity (U.S. Pat. No. 4,672,517). The flux density B is here kept below the saturation flux density Bsat. However, automatic following of the flux density is not provided in this clocked current supply. A dc/dc current converter with asymmetrical half bridge circuit has, furthermore, been suggested, in which the controllable switching means of the half bridge circuit are driven with phase-displaced control pulses of essentially 180<o phase shift, all of identical width and where the control pulses at least partially overlap in time (DE-OS 36 03 071). This converter combines the advantages of a full bridge chopper circuit with the advantages of a half bridge chopper circuit, because even though an asymmetrical half bridge chopper circuit is used, quasi-symmetrical operation becomes possible. In contrast to a conventional asymmetrical bridge circuit this permits the energy transfer to take place not only during 50% of a period but over maximally the entire period. Of disadvantage in this known converter is that the compensation current required for the automatic compensation of a unipolar flux, which readily reaches and exceeds the nominal current of the converter, cannot be adapted to load changes or only at great expense. (European Patent Application 861169.6=Publication No. 0 231 481, FIG. 6). This disadvantage has its cause in that between the asymmetrical half bridge circuit and a full-wave rectifier circuit a transformer is interconnected, the primary winding of which functions as compensation winding for the half bridge circuit. Due to the transformer effect, the compensation winding on the primary side cannot supply the requisite ampere winding number, given large winding number and small current, so that with small winding number a large current must flow.

Automatic following of the primary compensation current is, however, of great importance, in particular if on the secondary side of the transformer no-load operation obtains, which leads to high pulsing currents on the primary side.

The present invention, therefore, is based on the task of creating a circuit arrangement, which permits rapid adaptation of the compensation current in a unipolar device.

This problem is solved with an arrangement which detects at least a part of the current which is responsible for the generation of the magnetic flux of the component, and generates the superimposing magnetic flux on the basis of the detected current.

The advantage achieved with the invention consists in particular in that converters with asymmetrical half bridge circuits can be operated up into very high power ranges.

Figure 2:
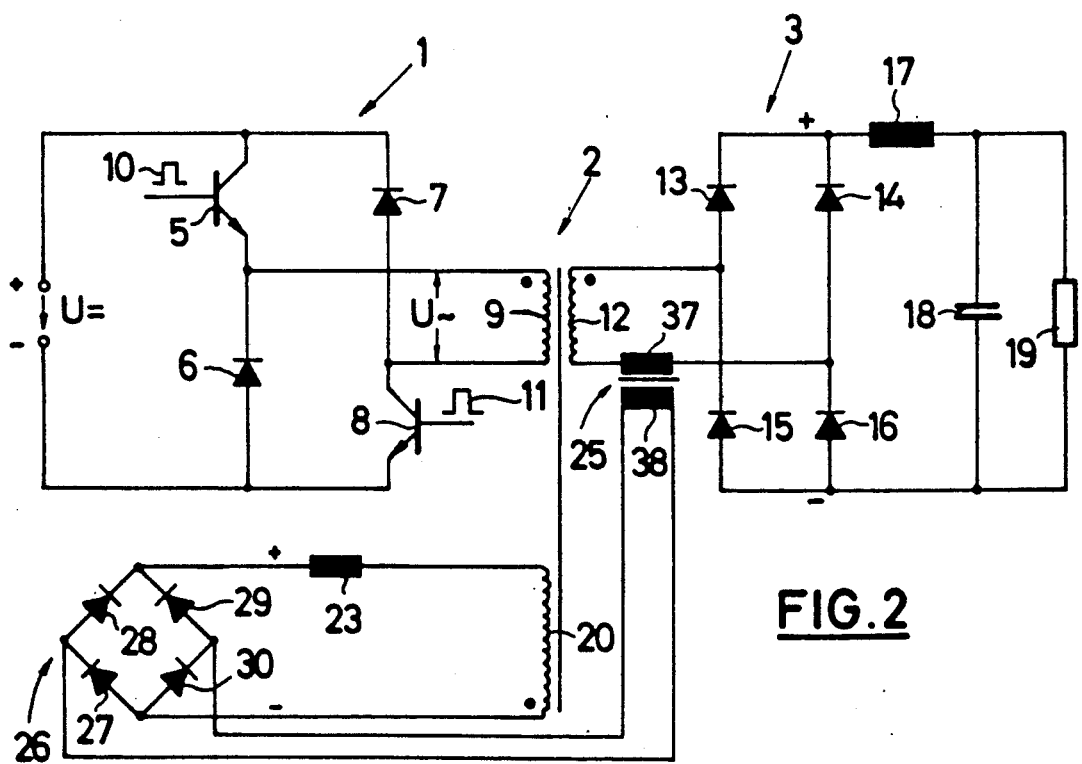
Figure 3:
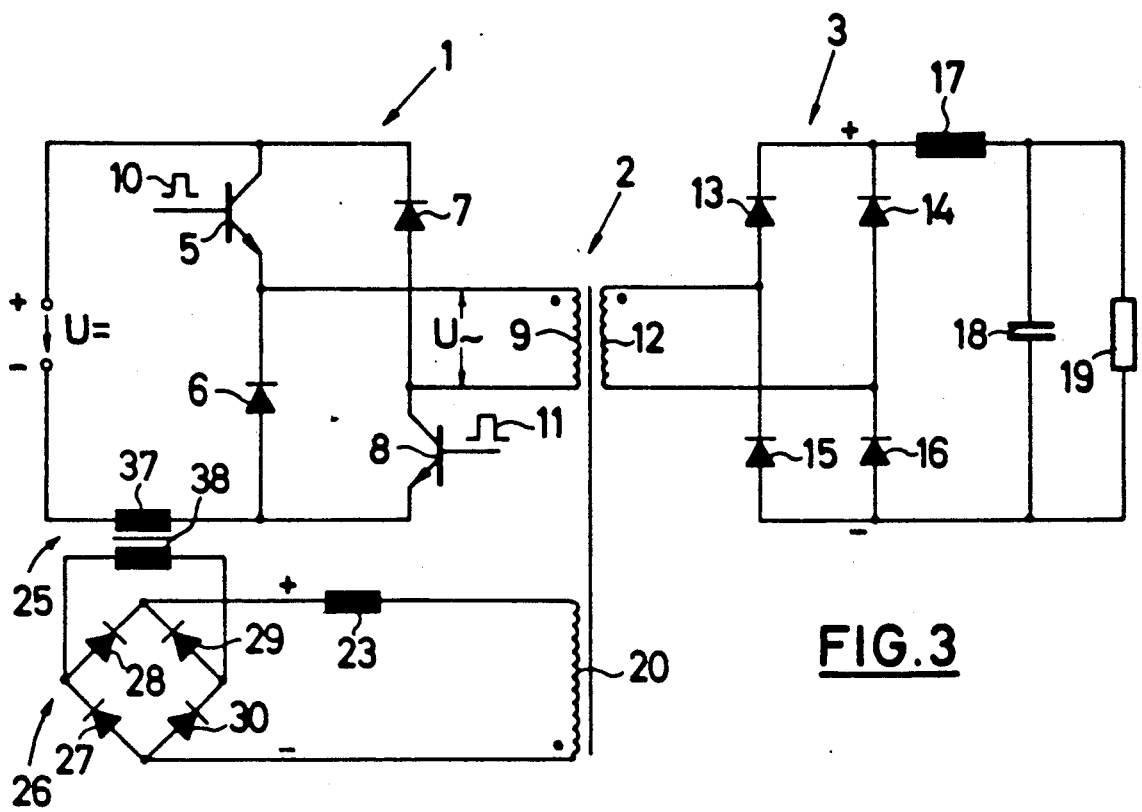
Figure 4:
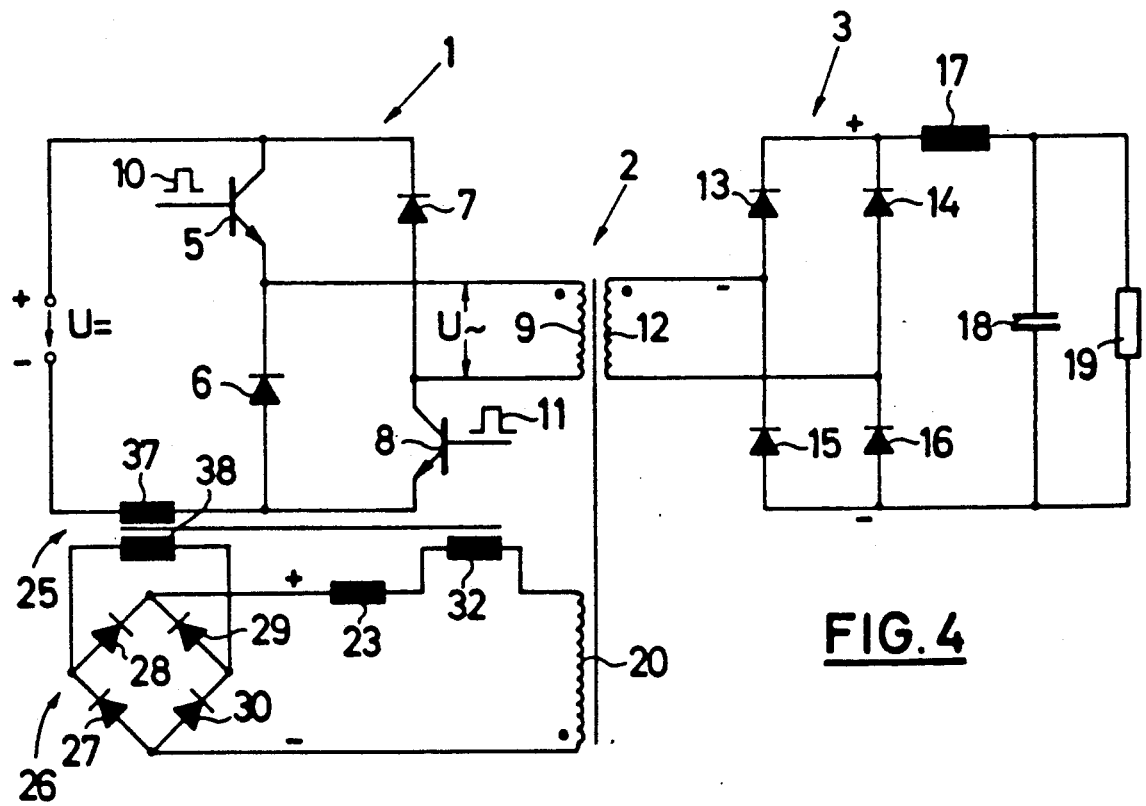
Figure 5:
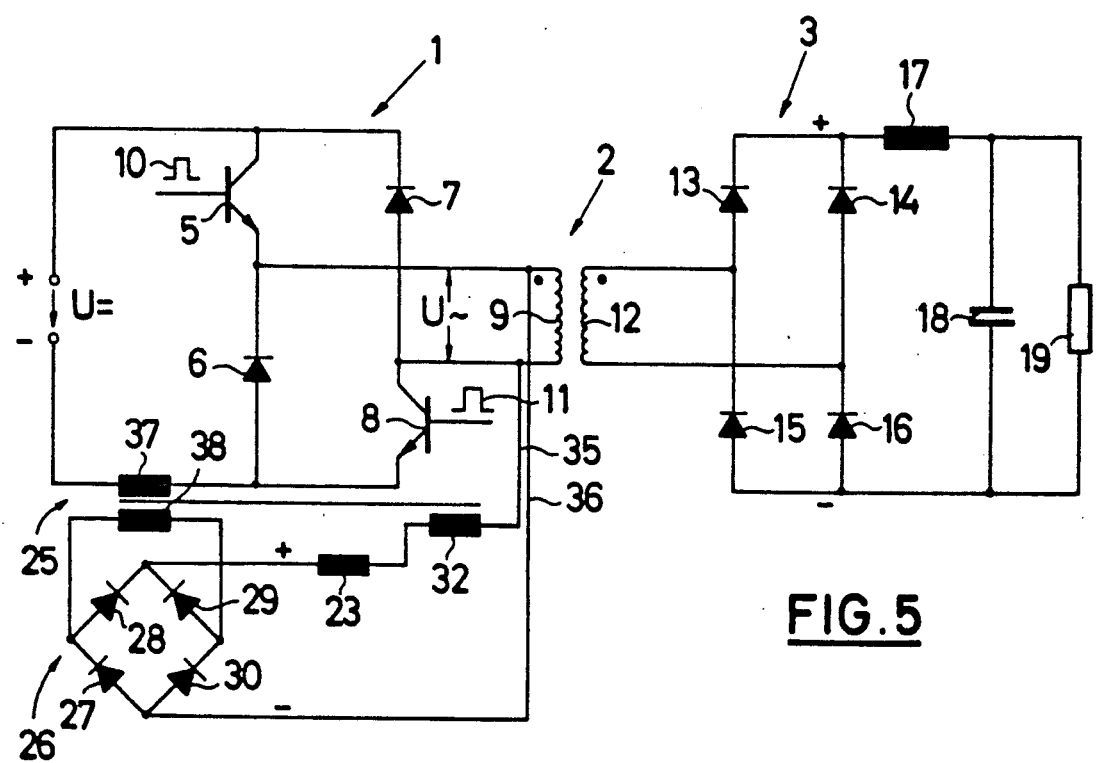

Embodiments of the invention are represented in the drawing and are described in greater detail below. The drawing shows:

FIG. 1 a dc/dc current converter and a transformer, onto whose magnetic field a field stemming from an external energy source is superimposed;

FIG. 2 a device according to the invention with a self-fed current converter on the secondary side of a dc/dc current converter;

FIG. 3 a second device according to the invention with a self-fed current converter on the primary side of a dc/dc current converter;

FIG. 4 a third device according to the invention with a self-fed current converter on the primary side of a dc/dc current converter with the dc magnetic field of this current converter being compensated;

FIG. 5 a fourth device according to the invention, in which a compensation winding is connected to a component capable of storing energy.

In FIG. 1 an arrangement is shown, which has an asymmetrical bridge circuit respectively a chopper 1, a transformer 2, a full-wave rectifier 3, and an externally fed current converter 4. The chopper 1 chops a dc voltage $U_=$ forming an ac voltage, which is transformed by transformer 2 and rectified by full-wave rectifier 3.

Chopper 1 has in parallel with the dc voltage $U_=$ a first shunt arm consisting of transistor 5 and diode 6. Connected in parallel with this first shunt arm is a second shunt arm with diode 7 and transistor 8 in series with it. The collector of transistor 5 of the first shunt arm is connected to the positive pole of the dc voltage $U_=$, while the anode of diode 6 of the first shunt arm is connected to the negative pole of the dc voltage $U_=$. The cathode of this diode 6 is connected to the emitter of transistor 5. In the second shunt arm diode 7 and transistor 8 are connected differently. Here the cathode of diode 7 is connected to the positive pole of the dc voltage $U_=$, while the emitter of transistor 8 is connected to the negative pole of the dc voltage $U_=$. The anode of diode 7 is connected to the collector of transistor 8. Between the emitter of transistor 5 and the collector of transistor 8, in addition, inductor 9 is connected, across which an ac voltage $U\sim$ drops. The drive pulses, which are applied to the bases of transistors 5 and 8, are represented symbolically in FIG. 1 and denoted by 10 and 11 respectively. The width of these drive pulses 10 and 11 is always constant. Variable are solely the points in time at which pulses 10 and 11 appear, i.e. the drive pulses 10 at transistor 5 can be displaced in time relative to the drive pulses 11 at transistor 8.

Inductor 9 is the primary winding of transformer 2, whose secondary winding 12 is connected to the full-wave rectifier 3, which has four diodes 13 to 16. The secondary winding 12 is connected on the one hand to the link between the anode of diode 13 and the cathode of diode 15 and, on the other hand, to the link between the anode of diode 14 and the cathode of diode 16. To the full-wave rectifier 3 a filter element with a series inductor 17 and a shunt capacitor 18 is connected with load 19 lying parallel to this shunt capacitor 18.

Onto the magnetic field generated by the primary winding 9 a dc magnetic field is superimposed with winding 20 being provided for the generation of the dc magnetic field, which is fed from an external ac voltage source 21. A full-wave rectifier 22 and a smoothing choke 23 are interconnected between this external ac voltage source 21 and winding 20.

In FIG. 2 a circuit arrangement is shown, which differs with respect to the generation of the dc magnetic field from the circuit arrangement according to FIG. 1. For that reason, those elements, which are identical in FIGS. 1 and 2, are provided with identical reference numbers. In contrast to the converter according to FIG. 1, the converter according to FIG. 2 is a self-fed arrangement in which the compensation energy is not taken from an external voltage source.

Winding 20 and smoothing choke 23 are series-connected to full-wave rectifier 26, which consists of four diodes 27 to 30 and which is fed from the secondary winding 38 of a current converter 25, whose primary winding 37 is in series with the secondary winding 12 of transformer 2.

The circuit arrangement according to FIG. 3 differs from the circuit arrangement according to FIG. 2 in that the primary winding 37 of current converter 2 is arranged on the chopper side of the dc/dc current converter. This primary winding 37 is interconnected between the negative pole of the dc voltage source $U_=$ and the anode of diode 6.

In FIG. 4 a circuit arrangement is shown which differs from the circuit arrangement according to FIG. 3 in that the dc flux is compensated by current converter 25 itself from the voltage gained from current converter 25. To that end, choke 32 is connected in series with choke 23 and winding 20, with the magnetic dc flux of this choke 32 being superimposed on the dc flux fraction of current converter 25. The winding ratio of current converter 25 is so selected that automatic and load-independent compensation of the premagnetization occurs.

As is apparent in FIGS. 1 to 4, the polarity of the dc fields generated by winding 20 is opposite to that of the dc field fraction generated by primary winding 9. This reduces strongly the dc field fraction, which originates due to the asymmetrical half bridge circuit, or it compensates it completely. The cross section of primary winding 9 can, consequently, be made considerably smaller.

In FIG. 5 a circuit arrangement is shown which differs from the circuit arrangement according to FIG. 4 in that winding 20, which generates the compensation flux, has been dispensed with entirely. In this case the primary winding 9 of transformer 2, in this case, itself takes over the generation of the compensation flux. Between the one connection of primary winding 9, therefore, a direct link to choke 32 exists across line 35, while the other connection of this primary winding 9 is connected across line 36 to the negative pole of rectifier 26.

Choke 23 has the function of decreasing the residual ripples of the dc current supplied by the full-wave bridge circuit. But it also prevents a short circuit due to ac current between transformer 2 and current converter 25. Although the invention has been described with reference to an asymmetrical half bridge circuit, it is not limited to it. Rather, it can be applied wherever an ac flux is superimposed by a dc flux respectively where unipolar operation obtains.

We claim:

1. An apparatus for transforming a first dc voltage into a second dc voltage, comprising:
   an input for receipt of a first dc voltage;
   means, coupled to said input, for producing unipolar pulses from said first dc voltage;
   a transformer, said transformer having a primary winding coupled to said producing means for receipt of said unipolar pulses, and a secondary winding,
   said transformer generating a first magnetic flux in response to said unipolar pulses;
   an output coupled to said secondary winding for output of a second dc voltage; and
   means, coupled to said transformer and responsive to a current flowing in response to said unipolar pulses, for generating a second magnetic flux and superimposing said second magnetic flux upon said first magnetic flux,
   said superimposed magnetic fluxes providing a total magnetic flux that is varied.

2. An apparatus as stated in claim 1, wherein said second magnetic flux generating and superimposing means further comprises:
   a current converter having a primary and a secondary winding;
   a rectifier, coupled to said transformer;
   said primary winding of said current converter coupled to said transformer and said secondary winding of said current converter coupled to said rectifier;
   said rectifier providing an output dc voltage which generates said second magnetic flux.

3. An apparatus as stated in claim 1, wherein said generating means responsive to a current flow further comprises:
   means for detecting and responding to at least a part of a current flowing through the primary winding of the transformer.

4. An apparatus as stated in claim 1, wherein said generating means responsive to a current flow further comprises:
   means for detecting and responding to at least a part of a current flowing through the secondary winding of the transformer.

5. An apparatus as stated in claim 1, wherein said producing means further comprises:
   an asymmetrical half bridge circuit.

6. An apparatus as stated in claim 5, wherein said asymmetrical half bridge circuit further comprises:
   a chopper unit for a dc/dc current converter; and
   a controllable switching means, coupled to said chopper unit, for driving the asymmetrical half bridge circuit with phase-displaced control pulses of constant width.

7. An apparatus as stated in claim 6, further comprising:
   a current converter, coupled to said primary winding, for taking a current from a primary circuit which serves to compensate a dc field fraction of said primary winding.

8. An apparatus as stated in claim 6, further comprising:
   a current converter, coupled to said secondary winding, for taking a current from a circuit coupled to said secondary winding which serves to compensate a dc field fraction of the primary winding.

9. An apparatus as stated in claim 1, wherein said secondary winding of the transformer is coupled to a rectifier.

10. An apparatus as stated in claim 1, wherein said generating and superimposing means attenuates said first flux.

11. An apparatus for transforming a phase-controlled chopped dc voltage of unipolar pulses into an output dc voltage, comprising:
    an input for receipt of a plurality of unipolar pulses;
    a transformer, said transformer having a primary winding coupled to said input for receipt of said plurality of unipolar pulses, and a secondary winding;
    an output coupled to said secondary winding for output of an output dc voltage; and
    means, coupled to said transformer and responsive to a current flowing in response to said plurality of unipolar pulses, for varying a flux of said transformer produced by said plurality of unipolar pulses, with said varying means including a current converter for detecting at least a part of a current responsible for generating of a magnetic flux in said transformer.

12. An apparatus for transforming a phase-controlled chopped dc voltage of unipolar pulses into an output dc voltage, comprising:
    an input for receipt of a plurality of unipolar pulses;
    inductance means, coupled to said input, for producing a first magnetic flux in response to said plurality of unipolar pulses;
    an output coupled to said producing means for output of an output dc voltage; and
    means, coupled to said producing means and responsive to a current flowing in response to said plurality of unipolar pulses, for generating and superimposing a second magnetic flux upon said first magnetic flux.

13. A unipolarly operated electrical circuit component for us in a dc/dc converter, comprising:
    an electrical circuit component which can store magnetic energy by producing a magnetic flux, with said magnetic flux produced by said electrical circuit component being varied by a superimposed magnetic flux;

an asymmetrical half bridge circuit coupled to said electrical circuit component, said asymmetrical half bridge circuit comprising:
  a chopper unit; and
  a controllable switching means, coupled to said chopper unit, for providing said asymmetrical half bridge circuit with phase-displaced control pulses of constant width;

means, coupled to said electrical circuit component, for detecting at least a part of a current which is responsible for producing said magnetic flux of said electrical circuit component;

means, coupled to said detecting means and responsive to said detected current, for generating said superimposing magnetic flux; and said detecting means and said generating means having a current converter, said current converter comprising:
  a primary side coupled to said electrical circuit component, for taking a current from a primary circuit which serves to compensate a dc field fraction of said electrical circuit component; and
  a secondary side coupled to a rectifier circuit, said rectifier circuit having a choke coil coupled to said electrical circuit component,
  said current converter generating a compensation dc field.

14. A unipolarly operated electrical circuit component for use in a dc/dc converter, comprising:
  an electrical circuit component which can store magnetic energy by producing a magnetic flux in response to a producing current, with said magnetic flux produced by said electrical circuit component varied by a superimposed magnetic flux produced by a superimposing current;
  means, coupled to said electrical circuit component, for detecting at least a part of said producing current;
  means, coupled to said detecting means and responsive to said detected current, for generating said superimposing magnetic flux; and
  said detecting means and said generating means including a current converter, said current converter comprising:
    a primary side coupled to said electrical circuit component, for taking a compensation current from a primary circuit of a dc/dc converter which serves to compensate a dc field fraction of said electrical circuit component;
    a secondary side coupled to said electrical circuit component; and
    a compensation winding, said compensation winding being flown with said compensation current which produces said superimposing flux,
  such that said current converter generates a compensation dc field.

15. A unipolarly operated electrical circuit component for us in a dc/dc converter, comprising:
  an electrical circuit component which can store magnetic energy by producing a magnetic flux in response to a producing current, with said magnetic flux produced by said electrical circuit component varied by a superimposed magnetic flux produced by a superimposing current;
  means, coupled to said electrical circuit component, for detecting at least a part of said producing current;
  means, coupled to said detecting means and responsive to said detected current, for producing said superimposing magnetic flux; and
  said detecting means and said generating means including a current converter, said current converter comprising:
    a primary side coupled to said electrical circuit component, for taking a compensation current from a primary circuit of a dc/dc converter which serves to compensate a dc field fraction of said electrical circuit component;
    a secondary side coupled to said electrical circuit component; and
    a compensation winding, said compensation winding being flown with said compensating current which produces said superimposing flux, said compensation winding comprising a primary winding of said electrical circuit component wherein said compensation current flowing in said compensation winding is in opposition to said producing current flowing in said primary winding,
  such that said current converter generates a compensation dc field.

16. A unipolarly operated electrical circuit component for use in a dc/dc converter as claimed in claim 15 wherein a first input of said primary winding is coupled to said compensation winding and a second input of said primary winding is directly coupled to a rectifier coupled to said secondary side of said current converter.

* * * * *